(12) United States Patent
Johnson et al.

(10) Patent No.: US 10,195,978 B2
(45) Date of Patent: Feb. 5, 2019

(54) APPARATUS FOR DEPLOYING AND RETRIEVING HIGHWAY PANELS

(71) Applicant: J-Tech, Inc., Chester Springs, PA (US)

(72) Inventors: Richard S. Johnson, Pottstown, PA (US); Collin E. Johnson, Pottstown, PA (US); Joe E. Snyder, Pottstown, PA (US); Jason M. Rohrer, Reading, PA (US); Dave E. Brown, Goodville, PA (US)

(73) Assignee: J-Tech, Inc., Chester Springs, PA (US)

( * ) Notice: Subject to any disclaimer, the term of this patent is extended or adjusted under 35 U.S.C. 154(b) by 336 days.

(21) Appl. No.: 14/940,974

(22) Filed: Nov. 13, 2015

(65) Prior Publication Data

US 2016/0137119 A1 May 19, 2016

Related U.S. Application Data

(60) Provisional application No. 62/081,448, filed on Nov. 18, 2014.

(51) Int. Cl.
*B60P 1/44* (2006.01)
(52) U.S. Cl.
CPC .................................. *B60P 1/4485* (2013.01)
(58) Field of Classification Search
CPC ........... B60P 1/4485; B60P 1/02; B60P 1/022; B60P 1/43; B60P 1/44; B60P 1/4414; B60P 1/445; B60P 1/4471; B60P 1/486; B60P 1/52; B60P 1/435; E01F 9/00; E01F 9/60; E01F 9/70

USPC .................................................. 414/462–466
See application file for complete search history.

(56) References Cited

U.S. PATENT DOCUMENTS

| | | | | |
|---|---|---|---|---|
| 3,750,900 A | * | 8/1973 | Piercey | E01F 9/70 414/503 |
| 4,408,666 A | * | 10/1983 | Lawson | A01G 20/15 172/19 |
| 4,579,503 A | * | 4/1986 | Disque | B60P 1/445 414/546 |
| 5,213,464 A | | 5/1993 | Nicholson et al. | |
| 6,056,498 A | | 5/2000 | Velinsky et al. | |
| 7,306,398 B2 | | 12/2007 | Doran, Jr. | |
| 7,581,918 B2 | * | 9/2009 | Jordan | E01F 9/70 198/315 |
| 8,047,384 B2 | * | 11/2011 | Mrowiec | E01F 9/70 211/44 |

(Continued)

*Primary Examiner* — Lynn E Schwenning
(74) *Attorney, Agent, or Firm* — Miller Law Group, PLLC (57) ABSTRACT

An apparatus facilitates the deployment and retrieval of highway panels and includes a work basket mountable on the rearward end of a truck to be vertically moveable relative thereto. A ramp member is detachably mounted on a selected side of the work basket to be movable therewith. A lift member is detachably mounted on a four-bar lift linkage carried by the truck along the selected side thereof. The lift member is vertically movable by the lift linkage to raise the highway panels from the ramp member to the level of the truck bed on which the highway panels are transported. Both the ramp and lift members are formed with rollers on the top surface to facilitate the movement of the highway panels in both deployment and retrieval. Retrieval is accomplished by moving the truck rearwardly and tipping the highway panel so the ramp member can slide underneath the base.

14 Claims, 8 Drawing Sheets

(56) References Cited

U.S. PATENT DOCUMENTS

| | | | |
|---|---|---|---|
| 8,979,465 B2* | 3/2015 | Brown | B66F 9/065 |
| | | | 414/518 |
| 2009/0097914 A1* | 4/2009 | Flynn | E01F 9/70 |
| | | | 404/9 |
| 2013/0156532 A1* | 6/2013 | Hemphill | B60P 1/02 |
| | | | 414/495 |
| 2013/0175820 A1* | 7/2013 | Lepage | B60P 3/40 |
| | | | 296/26.08 |
| 2015/0110594 A1* | 4/2015 | Descoteaux | B60P 3/14 |
| | | | 414/800 |

* cited by examiner

APPARATUS FOR DEPLOYING AND RETRIEVING HIGHWAY PANELS

CROSS-REFERENCE TO RELATED APPLICATIONS

This application claims domestic priority on U.S. Provisional Patent Application Ser. No. 62/081,448, filed on Nov. 18, 2014, the content of which is incorporated herein by reference.

FIELD OF THE INVENTION

This invention relates generally to the placement of panels on highways for lane closures and, more particularly, to an apparatus for the placement of the highways panels to close a lane of traffic, and for the retrieval of the displayed panels from the highway.

BACKGROUND OF THE INVENTION

The closure of lanes of traffic on highways for the purposes of highway maintenance and construction is initiated by the placement of panels on the highway to provide an indication to the oncoming traffic that the lane is being closed to traffic. The placement of highway markers in some locations of the country is accomplished by the placement of traffic cones or plastic barrels. In other areas of the country, lane closure is initiated by the placement of highway panels formed with a heavy resilient base member and a removable upright reflective panel that fits into the base. These highways panels have advantages over cones and barrels in that the heavy resilient base is less likely to be displaced positionally from wind, including the air movement associated with moving vehicles, and the reflective panels do not typically become projectiles when struck by a moving vehicle.

The highway panels are manufactured with a heavy resilient base that typically weighs approximately forty pounds and presents an elongated generally rectangular support member for mounting the reflective panel member. The base member has a low profile above the surface of the highway to be less subjective to wind forces and is provided with a central receiver into which the reflective panel is seated when the highway panels are assembled for placement on the highway. Placement of the highway panels is typically accomplished manually from a truck carrying a supply of the highway panel components, i.e. the base member and the reflective panel.

Once assembled, the highway panels are placed onto the highway by manual operations involving workers positioned on the truck and on a work basket typically carried at the rear of the truck. The highway panels are positioned by hand along the lane to be closed to traffic by the workers placing the panels onto the surface of the highway. The weight of the base member becomes a limiting factor in the speed at which these highway panels can be displayed. Furthermore, the weight of the base member results in fatigue in the workers which are required to handle the heavy highway panels.

Retrieving the highway markers is typically accomplished by a worker tipping the highway panel by grasping the top of the reflective panel member to raise one end of the connected base member, whereupon the worker will then grasp the base member and lift the highway panel from the surface of the road onto the truck, although multiple workers might be utilized to lift the highway panels from the surface of the highway onto the elevated surface of the truck bed. Again, the weight of the base member, which is important in the stability of the highway panel during use in diverting traffic from the closed lane, becomes a liability in the retrieval of the highway panels by causing fatigue for the workers deployed to retrieve the highway signs and place the highway signs onto the truck.

Mechanisms have been developed for the placement and retrieval of cone markers, as can be seen in U.S. Pat. No. 5,213,464, granted on May 25, 1993, to John Nicholson, et al, in which a rotating wheel mechanism engages the cone markers guided into the wheel mechanism by a guide member, engages the base of cone marker to invert the cone for engagement with stripper bars that remove the inverted cone marker from the elevating wheel mechanism for placement of the cone marker where the cone marker can be grasped and placed onto the truck bed. The Nicholson wheel mechanism can also be utilized to deploy the cone markers by a worker dropping the cone markers in a specified orientation into a guide device into engagement with the wheel mechanism that orients the cone markers into an upright orientation on the surface of the highway.

U.S. Pat. No. 6,056,498, granted to Steven Velinsky, et al, on May 2, 2000, provides substantially the same function as the Nicholson mechanism through the engagement of the cone marker by a guide mechanism to bring the cone marker into engagement with a lift arm that grasps the cone marker an pivotally elevates the cone marker to the level of the truck bed where the cone marker is stored manually. U.S. Pat. No. 7,306,398, issued to John Doran, Jr. on Dec. 11, 2007, discloses a more complicated arrangement for transferring cone markers from a truck onto the road surface through utilization of a placement arm.

It would be desirable to provide a mechanized apparatus for placement and retrieval of the highway panels between a truck and the surface of the highway to minimize fatigue in the workers handling the highway panels.

SUMMARY OF THE INVENTION

It is an object of this invention to overcome the disadvantages of the prior art by providing a mechanized apparatus for the placement and retrieval of highway panels.

It is another object of this invention to provide a mechanized apparatus for utilization in the deploying and retrieving of highway panels from a work site.

It is a feature of this invention that the apparatus for deploying and retrieving highway panels includes a work basket movably positionable at the rear of a truck to which the work basket is mounted.

It is an advantage of this invention that the vertically movable work basket can be moved from a raised transport position to a lowered operative position through manipulation of hydraulic cylinders.

It is another advantage of this invention that the ramp member mounted on the side of the work basket will be positioned with the rearward edge adjacent the surface of the highway when the work basket is lowered into the operative position.

It is another feature of this invention that the work basket can be formed with a frame that can support the operation of a hitch retriever at the rear thereof.

It is still another feature of this invention that the ramp member and the lift member can be stowed in a disassembled configuration underneath the bed of the truck on which the apparatus is mounted.

It is yet another feature of this invention that the lift member is mounted on a lift linkage that affects vertical movement of the lift member.

It is still another advantage of this invention that the lift member can be moved hydraulically by the lift linkage between a raised position that is even with the truck bed to a lowered position that is in alignment with the ramp member to receive a highway panel therefrom.

It is yet another advantage of this invention that the highway panels can be deployed or retrieved without requiring the highway panels to be manually lifted to or from the bed of the truck.

It is another feature of this invention that the lift linkage utilizes a four-bar linkage to keep the orientation of the lift member horizontal during the movement of the lift member between the raised and lowered positions.

It is still another feature of this invention that the ramp member is formed with forwardly extending stops that are engaged by lift member when moved to the lowered position to assure alignment between the forward end of the ramp member and the lift member.

It is a further feature of this invention that the rollers formed in the ramp member and the lift member create a moving floor when the lift member is aligned with the ramp member.

It is a further advantage of this invention that the moving floor created by the rollers on both the ramp member and the lift member facilitate the movement of the highway panels along the lift and ramp members for deployment and retrieval.

It is still another object of this invention to provide a method of deploying and retrieving highway panels relative to the surface of a highway and a truck for transporting the highway panels.

It is another feature of this invention that the highway panels can be deployed onto the highway by positioning the highway panels from the truck onto the highway by placing the highway panels onto the lift member and vertically moving the lift member into alignment with the ramp member and moving the highway panels onto the highway.

It is yet another advantage of this invention that the forward movement of the truck on which the apparatus is mounted will pull the highway panels onto the highway once the rearward edge has moved off the ramp member.

It is still another feature of this invention that the rollers forming the top surface of both the ramp member and the lift member create a moving floor to facilitate the forward or rearward movement of the highway panels.

It is yet another feature of this invention that retrieval of the highway panels can be accomplished by rearwardly moving the ramp member into engagement with a tipped highway panel resting on the highway surface and then guiding the highway panel along the ramp member onto the lift member to be raised vertically to the level of the truck bed.

It is a further object of this invention to provide an apparatus for deploying and retrieving highway panels between the bed of a truck transporting the highway panels and the surface of the highway, which is durable in construction, inexpensive of manufacture, carefree of maintenance, facile in assemblage, and simple and effective in use.

These and other objects, features and advantages are accomplished according to the instant invention by providing an apparatus for deploying and retrieving highway panels having a work basket mountable on the rearward end of a truck to be vertically moveable relative thereto. A ramp member is detachably mounted on a selected side of the work basket to be movable therewith. A lift member is detachably mounted on a four-bar lift linkage carried by the truck along the selected side thereof. The lift member is vertically movable by the lift linkage to raise the highway panels from the ramp member to the level of the truck bed on which the highway panels are transported. Both the ramp and lift members are formed with rollers on the top surface to facilitate the movement of the highway panels in both deployment and retrieval. Retrieval is accomplished by moving the truck rearwardly and tipping the highway panel so the ramp member can slide underneath the base.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENTS

Referring now to drawings, an apparatus mountable on a truck for placement and retrieval of highway markers and incorporating the principles of the instant invention can best be seen. References are made to left and right, as well as front and rear can be determined from reference to the truck on which the mechanism is mounted standing at the rear of the truck facing the front of the truck in the normal forward direction of travel of the vehicle.

Figure 1:
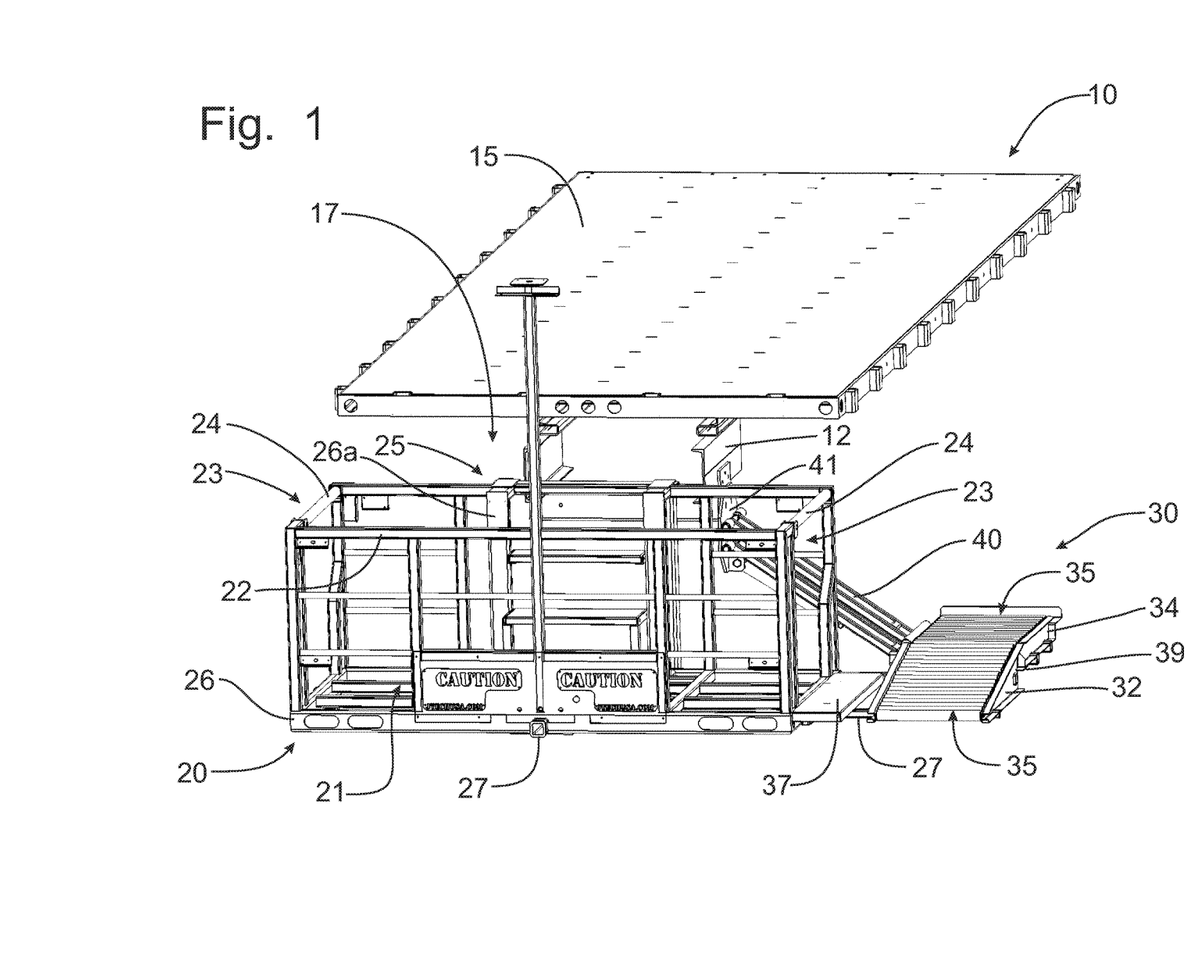
FIG. 1 is a rear perspective view of the apparatus in an operative configuration for deploying highway panels mounted on the right side of a vehicle with the lift member lowered to be in alignment with the ramp member.
Figure 2:
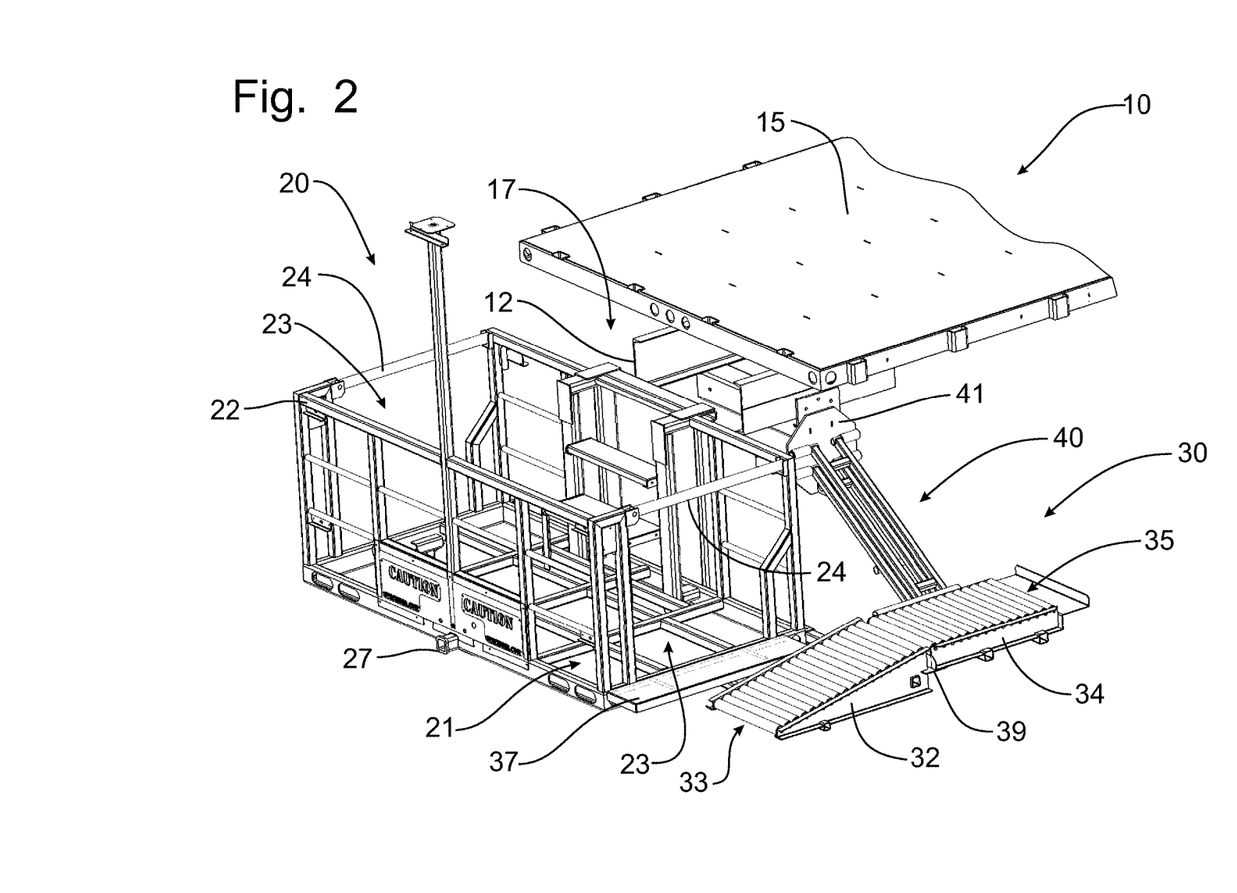
FIG. 2 is a right rear perspective view of the apparatus for deploying highway panels mounted on the right side of a vehicle with the lift member lowered to be in alignment with the ramp member.
Figure 3:
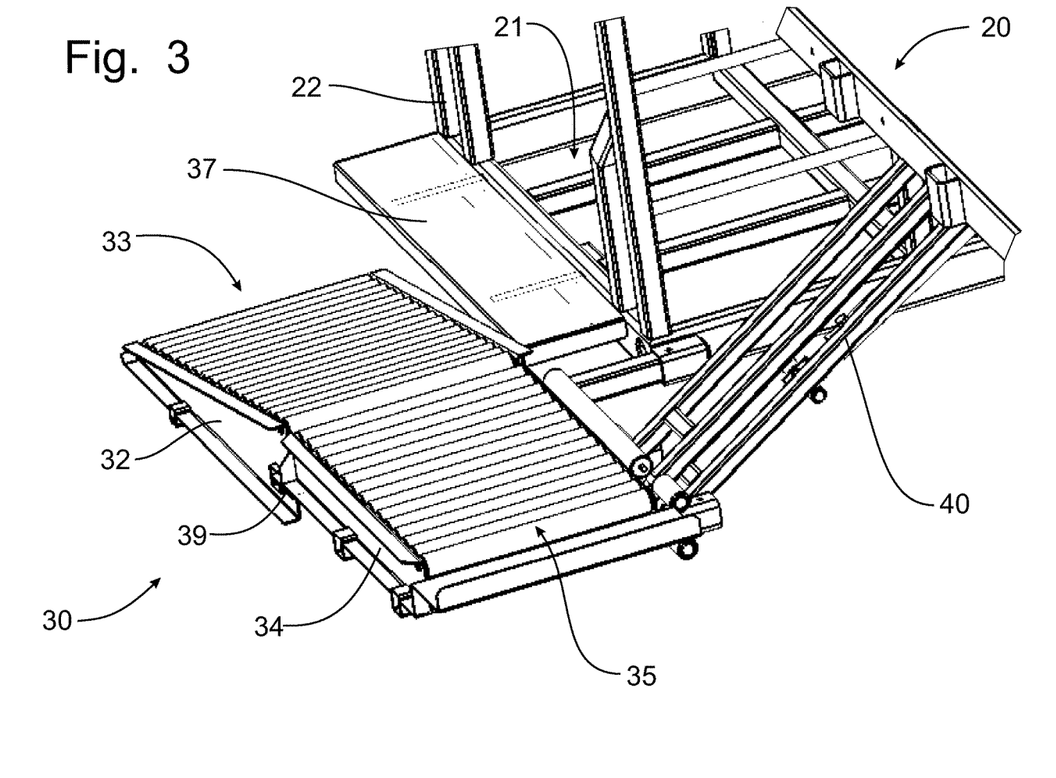
FIG. 3 is a front perspective view of the apparatus for deploying highway panels with the lift member mounted on the lift linkage and positioned in alignment with the ramp member mounted to the right side of the work basket.
Figure 4:
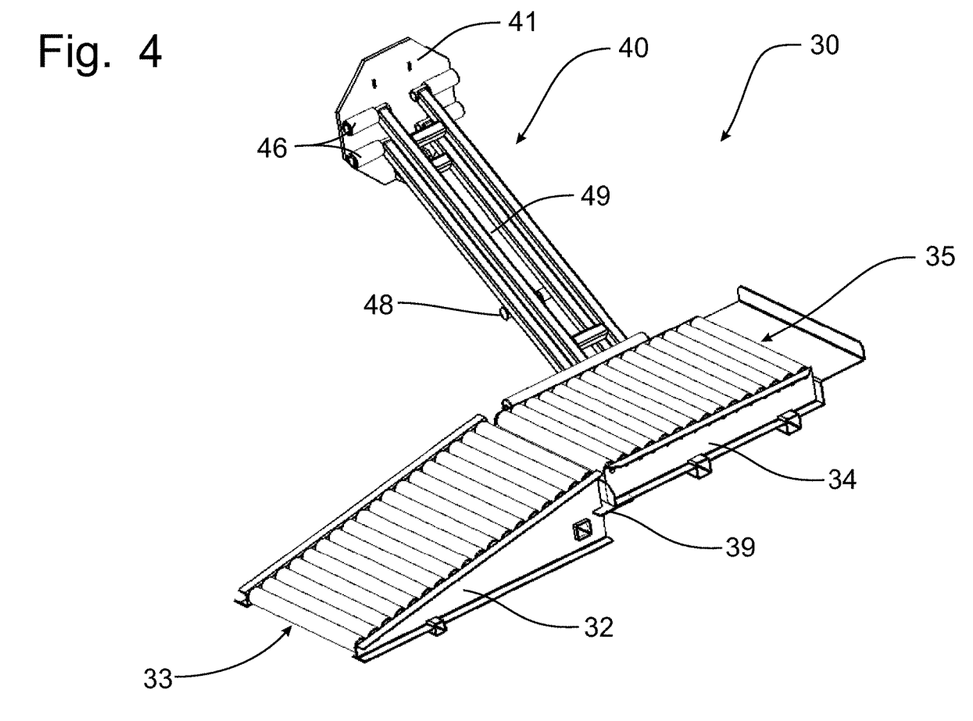
FIG. 4 is a right side perspective view of the ramp and lift members, and lift linkage, with the lift member mounted on the lift linkage and positioned in alignment with the ramp member.
Figure 5:
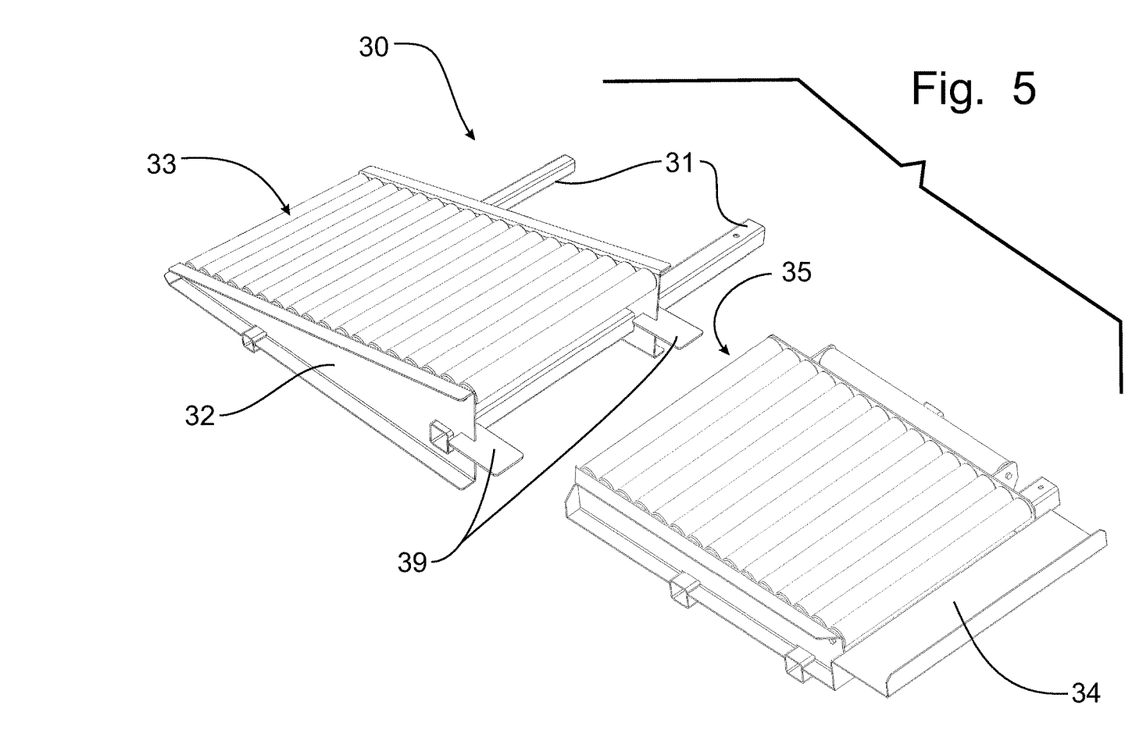
FIG. 5 is a right side perspective view of the ramp and lift members separated to depict the structure on the ramp member for receiving the lift member.
Figure 6:
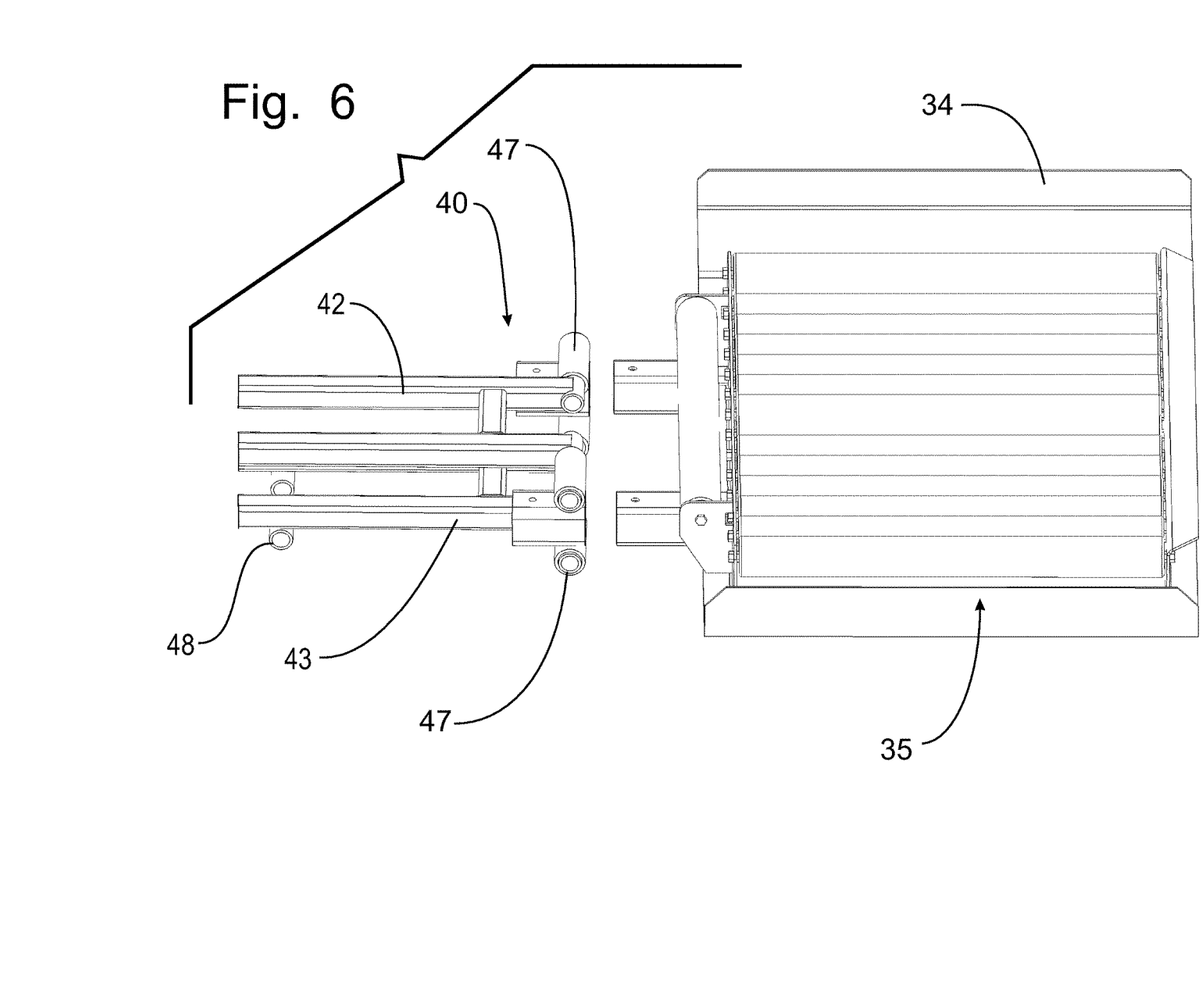
FIG. 6 is a rear perspective view of the lift linkage and lift member, separated to depict the structure coupling the lift linkage to the lift member.
Figure 7:
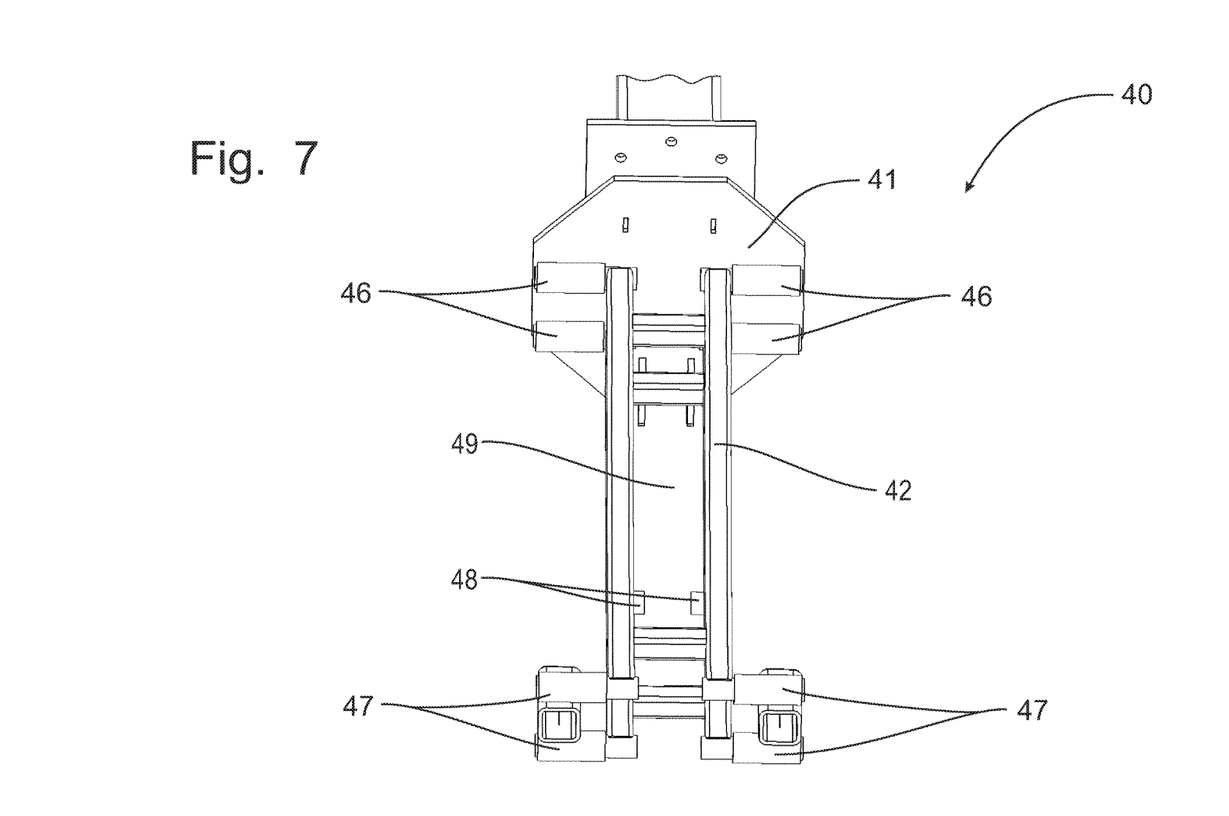
FIG. 7 is a right side elevational view of the lift linkage with the lift member removed for purposes of clarity, the hydraulic lift cylinder being located between the fore-and-aft legs of the lower lift arm.

A truck 10 (schematically represented by the truck bed shown in FIGS. 1-3) is used to carry a supply of highway panels (not shown) between a remote storage facility and the highway onto which the highway panels are to be placed to indicate a lane closure. The truck 10 typically includes a frame 12 on which is mounted a truck bed 15 and a rear end 17 from which the highway panels (not shown) can be moved to the surface of the highway.

A work basket 20 is mounted on the frame 12 of the truck 10 at the rear end 17 thereof to provide a work station from which workers can manipulate the highway panels at the surface of the highway. The work basket 20 is formed as a platform floor 21 (shown in FIG. 8, but broken away for purposes of clarity in FIGS. 1-3) with a fence railing 22 around the perimeter thereof. The fence railing 22 has two openings 23 therein on the opposing lateral sides of the basket 20 through which workers can access the surface of the highway. Each opening 23 is closed by a removable safety gate 24 when not being utilized. The basket 20 is formed with a mounting frame 25 that is connectable to the frame 12 of the truck 10 at the rear end 17. The mounting frame 25 slidably receives vertical components 26a of the frame 26 of the basket 20 such that the platform floor 21 is vertically movable relative to the mounting frame 25, and thus vertically movable relative to the truck bed 15. Preferably, a hydraulic cylinder (not shown) interconnects the mounting frame 25 and the frame 26 of the work basket 20 to power the vertical movement of the platform floor 21.

Thus, to mount the work basket 20 to the truck 10, the rear end 17 of the truck 10 is provided with the mounting frame 25 preferably bolted to the frame 12 of the truck 10. The mounting frame 25 then receives the vertical components 26a of the work basket frame 26 within vertically oriented brackets (not shown). The brackets of the mounting frame 25 are closed with detachable pins, or by bolts, that preferably carry rollers that facilitate the vertical movement of the vertical frame components relative to the mounting frame 25. The hydraulic cylinder interconnecting the mounting frame 25 and the frame 26 of the work basket 20 can then be connected to a hydraulic system carried by the truck 10 to enable the platform floor 21 to be vertically movable. The platform floor 21 is lifted to a maximum upward lift position to be transported from one location to another; however, when the highway signs are to be deployed, the platform floor 21 is typically moved lower toward the surface of the highway to facilitate deployment of the highway signs, as will be described in greater detail below.

Figure 8:
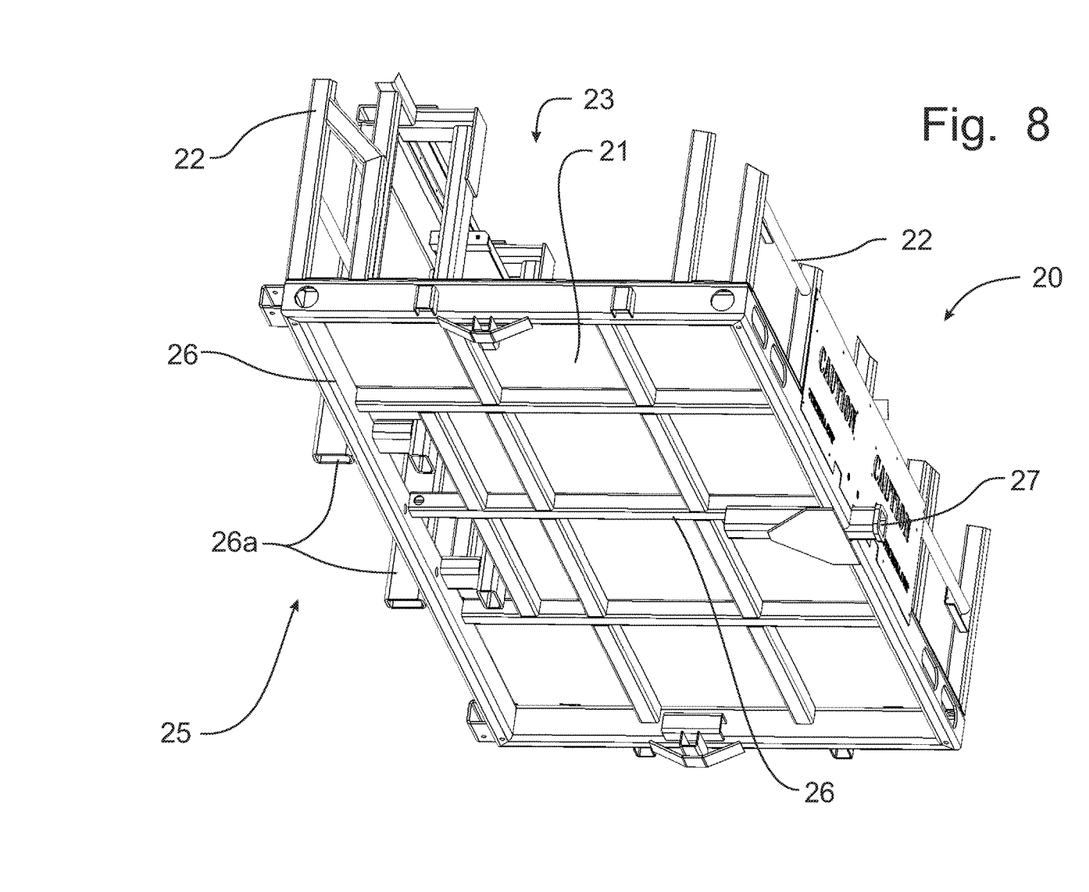
FIG. 8 is a left perspective view of the work basket depicting the reinforced frame on the underside of the work basket.

The work basket 20 is equipped with a working hitch receiver 27 that is affixed to the frame 26 underneath the platform floor 21. The frame 21, as can best be seen in FIG. 8, is reinforced at the rear central portion thereof to accommodate the towing forces associated with the use of the hitch receiver 27 to pull a loaded trailer (not shown). The towing forces, however, also have to be accommodated by the mounting frame 25 to transfer these towing forces to the frame 12 of the truck 10. To affect the transfer of the towing forces, the vertical members of the frame 26 of the work basket 20 slidably received within the mounting frame 25 are also strengthened, as well as the mounting frame 25 and the pins connecting the mounting frame 25 to the truck frame 12.

Referring now to FIGS. 1-7, the details of the apparatus 30 for deploying and retrieving the highway panels can best be seen. The apparatus 30 includes ramp member 32, a lift member 34 and a four bar lift linkage 40. The ramp member 32 and the lift member 34 are carried beneath the truck bed 15 when transported from one location to another, and are then installed on the work basket 20 and on the lift linkage 40, as will be described in greater detail below, when the highway panels are to be deployed or retrieved. Preferably, the ramp member 32 and the lift member 34 are constructed to be directionally utilized, meaning that a different ramp member 32 and lift member 34 are utilized on opposite sides of the work basket for placement of the highway panels on opposing sides of the truck 10. Accordingly, the ramp and lift members 32, 34 are transported in matching pairs on opposing sides of the truck 10. One skilled in the art will recognize that the mounting structure for the ramp and lift members 32, 34 could be configured to permit a single set of ramp and lift members 32, 34 to be utilized on opposing sides of the truck 10.

The lift linkage 40 is formed with a mounting plate 41 that is detachably connected to the frame 12 of the truck 10 underneath the bed 15, but near the rear end 17 forwardly of the work basket 20. The lift linkage 40 includes a pair of lift arms 42, 43 that have a pivot hub 46, 47 mounted at opposing ends thereof. The pivot hubs 46 connect the proximal ends of the lift arms 42, 43 to the mounting plate 41 in a manner that allow the distal ends of the lift arms 42, 43 to pivotally move vertically relative to the mounting plate 41. The distal ends of the lift arms 42, 43 carry the distal pivot hubs 47 for connection to the lift member 34 so that the lift member 34 can move vertically with the distal ends of the lift arms 42, 43.

The use of two lift arms 42, 43 interconnecting the mounting plate 41 and the lift member 34 serves as a four bar linkage that moves the lift member 34 in a horizontal orientation throughout the vertical movement thereof. The lift linkage 40 also includes a hydraulic lift cylinder 49 interconnecting the mounting plate 41 and an intermediate pivot hub 48 on the lower lift arm 43 to power the vertical movement of the distal ends of the lift arms 42, 43 and the attached lift member 34. The lift linkage 40 is constructed to be utilized on either opposing side of the truck 10 by disconnecting the mounting plate 41 and re-attaching the mounting plate 41 on the opposite side of the truck 10.

The lift member 34 is constructed with a frame that supports a plurality of rollers 35 that are mounted in a lateral configuration to provide a moving floor for the lift member 34 so that the highway panels positioned thereon will be easily moved in a fore-and-aft direction. The frame for the lift member 34 is configured to be positioned horizontally throughout the vertical movement thereof as powered by the hydraulic lift cylinder 49. The ramp member 32 is also constructed with a frame that supports a plurality of rollers 33 oriented laterally to provide a moving floor for the ramp member 34. The frame of the ramp member 32, however, is configured so that the rollers 33 provide a sloped moving floor that has a rearward lower edge positioned in use to be next to the surface of the highway and a forward edge that is raised above the rearward edge. The forward end of the frame of the ramp member 32 is formed with forwardly extending stops 39 that project forwardly of the ramp member frame to engage the lift member frame, as will be discussed in greater detail below.

The ramp member 32 is detachably connected in use to the frame 26 of the work basket 20 through the use of affixed support members 31 that are carried by the ramp member frame and inserted into receivers on the work basket frame 26, preferably in a spaced relationship to the platform floor 21 so that a step member 37 can be positioned between the platform floor 21 and the ramp member 32 for the convenience of the worker that will be accessing the highway panels on the surface of the highway. The lift member 34 is mounted on the distal ends of the lift arms 42, 43 in alignment with the ramp member 32. In the lowermost position, as depicted in FIGS. 2, 3, 7 and 8, the lift member 34 is rested on top of the stops 39 so that the horizontally disposed moving floor of the member 34 becomes a continuation of the upwardly sloped moving floor of the ramp member 32.

The ramp member 32 and lift member 34 can be mounted on either side of the truck 10. Accordingly, the frame 26 of the work basket 20 is configured for supporting the ramp member on either lateral side thereof. Similarly, the frame 12 of the truck 10 is configured to mount the mounting plate 41 of the lift linkage 40 on either side of the truck 10 so that the lift member 34 can be positioned in alignment with the ramp member 32, as described above.

In operation, the ramp member 32 is mounted to the frame 26 of the work basket 20 on the appropriate side thereof. The lift linkage 40 is mounted on the same appropriate side of the frame 12 of the truck, although the lift linkage 40 is typically left mounted on the truck frame 12 between operations for the sake of convenience. The lift member 34 is mounted on the distal pivot hubs 47 on the distal ends of the lift arms 42, 43 in a manner that the lift member 34 is vertically movable between being in a lowered position in alignment with the ramp member 32 and being in a raised position at the level of the truck bed 15. With a supply of highway panels on the truck bed, the apparatus 30 is ready to deploy the highway panels onto the surface of the highway.

The deployment of the highway panels (not shown) starts with the truck 10 moving forwardly with the lift member 34 raised to the level of the truck bed 15 where a worker places an assembled highway panel onto the rollers 35 forming the moving floor of the lift member 34. An operator lowers the lift member 34 by manipulation of the hydraulic lift cylinder 49 while the operation of the four bar lift linkage 40 keeps the lift member 34 in a horizontal orientation, until the lift member 34 rests on the stop members 39 affixed to the forward side of the frame of the ramp member 32, which is lowered with the work basket to an operating position by manipulating the hydraulic cylinder 29 to move the platform floor 21 and frame 26 relative to the mounting frame 25.

With the rearward edge of the ramp member 32 positioned adjacent the surface of the highway, a worker pulls the highway panel along the rollers 35 onto the sloped moving floor formed by the rollers 33 where gravity will move the highway panel down the sloped moving floor of the ramp member 32 and onto the surface of the highway. With the forward movement of the truck 10, the rearwardmost end of the base member of the highway panel stops on the highway surface and the ramp member 32 is pulled forwardly out from under the base member so that the highway panel is positioned on the highway surface.

As soon as the highway panel exits off of the lift member 34 onto the sloped moving floor of the ramp member 32, the operator again manipulates the hydraulic lift cylinder 49 to return the lift member 34 back to the level of the truck bed 15 where a worker again loads a highway panel onto the rollers 35 of the lift member. The above sequence of lowering the lift member 34 onto the stops 39 of the ramp member 32 and the highway panel is moved to the highway surface is repeated. With the substantially continuous forward movement of the truck 10 and the uniform loading of the highway panels onto the lift member 34, the highway panels become uniformly deployed along the highway to provide an indication of the lane closure.

Retrieving the highway panels is accomplished substantially in reverse of the above-described procedure for deploying the highway panels. The truck 10 is operated in reverse with the rear end 17 of the truck leading the movement of the truck 10. The operator lowers the lift member 34 onto the stops 39 of the ramp member 32 to provide continuity in the moving floors of the ramp member 32 and the lift member 34. A worker grasps the top edge of the panel member to tip the forwardmost edge of the base member of the highway panel upwardly so that the rearwardly moving rearward edge of the ramp member 32 moves underneath the tipped forward edge of the base member. Once the first roller at the rearwardmost edge of the ramp member 32 is underneath the base member, the rearward movement of the truck 10, which results in a corresponding rearward movement of the work basket 20 and the ramp member 32 mounted thereon, the movement of the ramp member 32 pushes the rollers 33 under the base member.

A forward pulling of the panel member urges the highway panel upwardly over the sloped moving floor of the ramp member 32 and onto the rollers 35 of the lift member 34. Once the highway panel is fully placed onto the lift member 34, the operator can manipulate the hydraulic lift cylinder 49 to raise the lift member, while the four bar lift linkage 40 maintains the lift member in a horizontal orientation. Once at the level of the truck bed 15, a worker can remove the highway panel from the lift member 34 without requiring the weight of the highway panel to be lifted from the highway surface to the truck bed 15.

The operator can then reverse the operation of the hydraulic lift cylinder 49 to lower the lift member 34 into engagement of the stops 39 on the ramp member 32. Meanwhile, the rearward movement of the truck 10 continues and the next highway panel in line is engaged in the same manner as described above so that the highway panel is eased onto the sloped moving floor of the ramp member 32. Once the lift member 34 is returned onto the stops 39 and is in alignment with the ramp member 32, the highway panel can be pushed forwardly onto the lift member 34, which is then raised to the truck bed 15 and removed. With the truck 10 moving at an appropriate speed in a rearward direction, the retrieval of the deployed highway panels can be accomplished smoothly without causing undo fatigue in the workers.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An apparatus including a work basket associated with a vehicle for deploying and retrieving highway panels from a highway surface, comprising:
   a ramp member having a frame connected to said work basket, said ramp member supporting a sloped moving floor and being configured to position a rearward end of said ramp member adjacent said highway surface while a forward end is elevated above said rearward end, said ramp member including stop members projecting forwardly from said ramp member frame;
   a lift member having a frame configured to be oriented in a horizontal orientation and supporting a horizontal moving floor, said lift member being movable between an elevated position for the placement of said highway panels between said vehicle and said lift member and a lowered position in engagement with said ramp member for movement of the highway panels between said ramp member and said lift member, said lift member frame engaging said stop members when said lift member is moved into said lowered position so that said horizontal moving floor is in alignment with said sloped moving floor of said ramp member; and a four bar lift linkage mounted on said vehicle and being operably connected to said lift member to vertically move said lift member between said elevated position and said lowered position, said four bar lift linkage extending laterally from said vehicle to support said lift member for vertical movement laterally of said vehicle.

2. The apparatus of claim 1 wherein said four bar lift linkage includes a hydraulic lift cylinder for powering the vertical movement of said lift member between said elevated and lowered positions.

3. The apparatus of claim 2 wherein said lift linkage comprises:
    a mounting plate adapted to be detachably connected to said vehicle;
    a pair of vertically spaced lift arms pivotally supported on said mounting plate at a proximal end of said lift arms and pivotally connected to said lift member at a distal end of said lift arms; and
    said hydraulic lift cylinder interconnecting said mounting plate and said lift arms to power a pivotal movement of said lift arms to vertically move said distal ends of said lift arms while maintaining said lift member in a horizontal orientation.

4. The apparatus of claim 3 wherein said lift member is positioned forwardly of said ramp member for the movement of said highway panels between said ramp member and said lift member, said lift member being vertically movable from the forward end of said ramp member at said lowered position and a storage facility on said vehicle at said elevated position.

5. The apparatus of claim 1 wherein both said ramp member and said lift member are formed with rollers mounted on a top surface thereof to define said respective moving floors on said ramp member and said lift member to facilitate the movement of said highway panels between said ramp member and said lift member when said lift member is in said lowered position and in alignment with said ramp member.

6. The apparatus of claim 1 wherein said work basket is mounted on said vehicle for vertical movement relative thereto, with said ramp member mounted on said work basket, said work basket is vertically positionable to locate the rearward end proximate to the surface of the highway.

7. The apparatus of claim 6 wherein said work basket includes a hitch receiver supported by a frame of said work basket, said hitch receiver being movable vertically with said work basket.

8. An apparatus associated with a vehicle for deploying and retrieving highway panels with respect to a highway surface, comprising:
    a work basket mounted on a rearward end of said vehicle, said work basket being vertically movable relative to said vehicle, said work basket including a hitch receiver supported by a frame of said work basket such that said hitch receiver is movable vertically with said work basket;
    a ramp member mountable on a selected side of said work basket, said ramp member having a frame and a moving floor along a top surface thereof, said ramp member frame being configured to position a rearward end of said ramp member adjacent said highway surface while a forward end is elevated above said rearward end, said ramp member further includes stop members projecting forwardly from said ramp member frame;
    a lift member positioned forwardly of said ramp member and having a frame configured to be oriented in a horizontal orientation, said lift member being movable between an elevated position for the movement of said highway panels between said vehicle and said lift member and a lowered position in alignment with said ramp member for movement of the highway panels between said ramp member and said lift member, said lift member having a moving floor along a top surface thereof to be alignable with said ramp member moving floor, said lift member frame engaging said stop members when said lift member is moved into said lowered position; and
    a four bar lift linkage mounted on said vehicle and being operably connected to said lift member to vertically move said lift member between said elevated position and said lowered position.

9. The apparatus of claim 8 wherein said four bar lift linkage includes a hydraulic lift cylinder for powering the vertical movement of said lift member between said elevated and lowered positions.

10. The apparatus of claim 9 wherein said lift linkage comprises:
    a mounting plate adapted to be detachably connected to said vehicle;
    a pair of vertically spaced lift arms pivotally supported on said mounting plate at a proximal end of said lift arms and pivotally connected to said lift member at a distal end of said lift arms; and
    said hydraulic lift cylinder interconnecting said mounting plate and said lift arms to power a pivotal movement of said lift arms to vertically move said distal ends of said lift arms while maintaining said lift member in a horizontal orientation.

11. A method of deploying and retrieving highway panels between a bed of a truck and a highway surface, comprising the steps of:
    providing a deployment apparatus having a work basket, a ramp member, a lift member, and a lift linkage, said work basket being supported rearwardly of said truck bed, said ramp member defining a sloped moving floor extending between a rearward end positionable adjacent said highway surface and an elevated forward end, said ramp member being supported from said work basket, said lift member defining a horizontal moving floor and being vertically movable so as to be selectively positionable in alignment with the forward end of said ramp member, and said lift linkage being supported on said truck and connected to said lift member to effect vertical movement of said lift member between a raised position adjacent said truck bed and a lowered position in alignment with said ramp member;
    raising said lift member to said truck bed;
    loading a highway panel onto said moving floor of said lift member;
    lowering said lift member to said lowered position in alignment with said ramp member, said lowering step resulting in an engagement of said lift member with stop members on said ramp member to assure alignment between said lift member and said ramp member;
    moving said highway panel along said horizontal moving floor of said lift member onto said sloped moving floor of said ramp member while said truck is operated to move along said highway surface; and
    sliding said highway panel along said sloped moving floor of said ramp member and onto said highway surface.

12. The method of claim 11 further comprising the step of:
   re-raising said lift member after said moving step to permit a subsequent loading step at least partly during said moving and sliding steps.

13. The method of claim 11 wherein said deployed highway panels can be retrieved according to the steps of:
   driving said truck rearwardly to position said rearward end of said ramp member adjacent said deployed highway panel;
   tipping said highway panel rearwardly to permit said rearward end of said ramp member to be positioned beneath a forward end of said highway panel;
   moving said retrieved highway panel forwardly over said moving floor of said ramp member as said truck continues to move rearwardly toward a subsequent deployed highway panel on said highway surface;
   positioning said retrieved highway panel onto said lift member positioned in alignment with said forward end of said ramp member;
   raising said lift member to said elevated position for the removal of said retrieved highway panel from said lift member for storage on said truck bed; and
   lowering said lift member to said lowered position in alignment with said ramp member for receipt of the subsequent retrieved highway sign.

14. The method of claim 13 wherein said tipping step is accomplished by an operator positioned on said work basket in proximity of said ramp member.

* * * * *